United States Patent [19]

Honda

[11] Patent Number: 5,446,126

[45] Date of Patent: * Aug. 29, 1995

[54] METHOD FOR REMOVING METAL IMPURITIES FROM RESIST COMPONENTS

[75] Inventor: Kenji Honda, Barrington, R.I.

[73] Assignee: OCG Microelectronic Materials, Inc., West Paterson, N.J.

[ * ] Notice: The portion of the term of this patent subsequent to Jan. 3, 2012 has been disclaimed.

[21] Appl. No.: 753,533

[22] Filed: Sep. 3, 1991

Related U.S. Application Data

[63] Continuation-in-part of Ser. No. 678,399, Apr. 1, 1991, abandoned.

[51] Int. Cl.⁶ ............................................. C08F 6/08
[52] U.S. Cl. ..................... 528/482; 528/486; 521/28; 430/190; 430/191; 430/192
[58] Field of Search ................ 528/482, 486; 521/28; 430/190, 191, 192

[56] References Cited

U.S. PATENT DOCUMENTS

| | | | |
|---|---|---|---|
| 3,067,172 | 12/1962 | Carlstrom | 528/482 |
| 3,509,084 | 4/1970 | Anspon et al. | 528/482 |
| 4,033,909 | 7/1977 | Papa | 521/131 |
| 4,070,313 | 1/1978 | Papa | 528/482 |
| 4,518,760 | 5/1985 | Smith et al. | 528/48 |
| 4,537,937 | 8/1985 | Cawlfield et al. | 525/417 |
| 4,871,779 | 10/1989 | Killat et al. | 521/28 |
| 4,965,167 | 10/1990 | Salamy | 430/191 |
| 5,378,802 | 1/1995 | Honda . | |

FOREIGN PATENT DOCUMENTS

| | | | |
|---|---|---|---|
| 57074370 | 5/1982 | Japan . | |
| 01228560A | 9/1989 | Japan | B01J 47/04 |

*Primary Examiner*—Joseph L. Schofer
*Assistant Examiner*—Richard Jones
*Attorney, Agent, or Firm*—William A. Simons

[57] ABSTRACT

A method of removing metal impurities from a resist component, comprising the steps of:
(a) dissolving said resist component in a solvent;
(b) washing a cation exchange resin with a solution of a quaternary ammonium compound;
(c) contacting the prewashed cation exchange resin with the solution of resist component to remove metal impurities from said solution of resist component; and
(d) separating said cation exchange resin bearing said metal impurities from said resist component solution.

10 Claims, No Drawings

METHOD FOR REMOVING METAL IMPURITIES FROM RESIST COMPONENTS

CROSS-REFERENCE TO RELATED APPLICATION

This application is a Continuation-In-Part Application of U.S. patent application Ser. No. 07/678,399 filed on Apr. 1, 1991, with Kenji Honda, Edward A. Fitzgerald, and Lawrence Ferreira as named inventors, now abandoned.

BACKGROUND OF THE INVENTION

1. Field of the Invention

This invention relates to a method for removing metal impurities from resist components. In particular, this invention relates to a method for removing metal impurities (including sodium, iron, calcium, chromium, copper, nickel, and zinc) from a resist component or resist composition solution by contacting that solution with a cation exchange resin which has been prewashed with a quaternary ammonium salt solution.

2. Brief Description of Prior Art

Photoresist compositions are used in microlithographic processes for making miniaturized electronic components such as in the fabrication of integrated circuits and printed wiring board circuitry. Generally, in these processes, a thin coating or film of a photoresist composition is first applied to a substrate material, such as silicon wafers used for making integrated circuits or aluminum or copper plates of printed wiring boards. The coated substrate is then baked to evaporate any solvent in the photoresist composition and to fix the coating onto the substrate. The baked coated surface of the substrate is next subjected to an image-wise exposure of radiation. This radiation exposure causes a chemical transformation in the exposed areas of the coated surface. Visible light, ultraviolet (UV) light, electron beam, and X-ray radiant energy are radiation types commonly used today in microlithographic processes. After this image-wise exposure, the coated substrate is treated with a developer solution to dissolve and remove either the radiation-exposed or the unexposed areas of the coated surface of the substrate.

There are two types of photoresist compositions—negative-working and positive-working. Both negative-working and positive-working compositions are generally made up of a film-forming resin and a photoactive compound dissolved in a suitable casting solvent. Additives may be added for specific functions. When negative-working photoresist compositions are exposed image-wise to radiation, the areas of the resist composition exposed to the radiation becomes less soluble to a developer solution (e.g., a cross-linking reaction occurs) while the unexposed areas of the photoresist coating remain relatively soluble to a developing solution. Thus, treatment of an exposed negative-working resist with a developer solution causes removal of the nonexposed areas of the resist coating and the creation of a negative image in the photoresist coating; and thereby uncovering a desired portion of the underlying substrate surface on which the photoresist composition was deposited. On the other hand, when positive-working photoresist compositions are exposed image-wise to radiation, those areas of the resist composition exposed to the radiation become more soluble to the developer solution (e.g., a rearrangement reaction occurs) while those areas not exposed remain relatively insoluble to the developer solution. Thus, treatment of an exposed positive-working resist with the developer solution causes removal of the exposed areas of the resist coating and the creation of a positive image in the photoresist coating. Again, a desired portion of the underlying substrate surface is uncovered.

After this development operation, the now partially unprotected substrate may be treated with a substrate etchant solution, plasma gases, or the like. The etchant solution or plasma gases etch the portion of the substrate where the photoresist coating was removed during development. The areas of the substrate where the photoresist coating still remains are protected and, thus, an etched pattern is created in the substrate material which corresponds to the photomask used for the image-wise exposure of the radiation. Later, the remaining areas of the photoresist coating may be removed during a stripping operation, leaving a clean etched substrate surface. In some instances, it is desirable to heat treat the remaining resist layer after the development step and before the etching step to increase its adhesion to the underlying substrate and its resistance to etching solutions.

Positive-working photoresist compositions are currently favored over negative-working resists because the former generally have better resolution capabilities and pattern transfer characteristics. Preferred positive-working photoresist today generally involve novolak resins and o-quinonediazide photoactive compounds dissolved in a suitable solvent.

Impurity levels in photoresist compositions are becoming an increasingly important concern. Impurity contamination, especially by metals, of photoresists may cause deterioration of the semiconductor devices made with said photoresists, thus shortening these devices' lives.

Impurity levels in photoresist compositions have been and are currently controlled by (1) choosing materials for photoresist composition which meet strict impurity level specifications and (2) carefully controlling the photoresist formulation and processing parameters to avoid the introduction of impurities into the photoresist composition. As photoresist applications become more advanced, tighter impurity specifications must be made.

In the case of novolak resin materials used for making positive photoresists, such novolak resins have been subjected to distillation or crystallization purification operations in order to remove impurities, especially metals. However, such operations have deficiencies. One, they are time-consuming and costly. More importantly, they do not remove impurities down to the very low levels now needed for advanced applications (i.e, in low parts per billion maximum levels).

Alternatively, ion exchange resins have been used for novolak impurities. One general technique is to pass an impure novolak resin solution through a cation exchange resin (e.g., AMBERLYST styrene sulfonic acid-divinyl benzene cation exchange resin). However, such treatments have several problems associated with it including the following:

1. The cation exchange resin treatment of the novolak may decrease the pH of the novolak-containing solution, possibly causing serious corrosion of metal containers in which the purified novolak-containing solution may be stored.

2. The purified novolak may have a decreased rate of dissolution during the development step of the photoresist which may be caused by the undesired adsorption of the lower molecular weight portion of novolak resin onto the cation exchange resin.

3. Alkali metals such as sodium and potassium are easily removed with conventional cation exchange resins. However, divalent or trivalent metal cations (e.g., $Cu^{+2}$, $Ni^{+2}$, $Zn^{+2}$, $Fe^{+2}$, $Fe^{+3}$, $Ca^{+2}$, or $Cr^{+3}$ ions) may have a lower affinity to conventional cation exchange resins. Iron and other easily oxidizable metals cannot be completely removed because they may be colloidal metal hydroxides or oxides. Such colloidals are not significantly removed by cation exchange resin treatment.

An ion exchange resin, particularly a strong acid-type of cation exchange resin, may decompose hydrolyzable resist components or solvents, therefor, such as ester groups. For example, ethryl lactate is decomposed by AMBERLYST A-15 to form polylactide moieties, which may degrade lithography performance of photoresists. As used herein, the term "polylactide" is defined as a polymeric or oligomeric product of lactide, a cyclic dimer of lactic acid which is formed by hydrolysis of ethyl lactate.

In addition to the standard cation exchange resin treatment of the novolak resin, it is known to subject complete photoresist compositions (e.g., novolak resin, photosensitizer, and solvent) to both cation and anionic exchange resin treatment. For example, Japanese Patent Publication (Kokai) No. 57-74370 discloses a method of reducing impurities in resists by using cation exchange resins and anion exchange resins in separate and a successive manner. Japanese Patent Publication (Kokai) No. 01-228,560, which was published on Sep. 12, 1989, teaches that the metal impurities content in photosensitive resin solutions or photoresist compositions may be reduced with a mixture of a cation and anion exchange resins. However, these techniques have the deficiency of not removing divalent and trivalent metal impurities and may decompose resist components or solvents containing resist components.

Usually, such cation and anion exchange resins have been washed with a solvent such as deionized water or the same solvent used to dissolve the resist component is already dissolved in. However, such washings with water or solvents will not clean the resins of pre-attached metal impurities because metal ions such as sodium or potassium as well as other acidic contaminates strongly bond to the anionically charged groups of cation exchange resins.

Accordingly, there is still a need in the photoresist art for improved methods of removing metal impurities from novolak resins and other materials used as photoresist components. The present invention is a solution to that need.

BRIEF SUMMARY OF THE INVENTION

Therefore, one embodiment of the present invention is directed to a method of removing metal impurities from a resist component, comprising the steps of:

(a) dissolving said resist component in a solvent;
(b) washing a cation exchange resin with a solution of a quaternary ammonium compound;
(c) contacting the prewashed cation exchange resin with the solution of resist component to remove (or transfer or sorption) metal impurities from said solution of resist component; and
(d) separating said cation exchange bearing said metal impurities from said resist component solution.

DETAILED DESCRIPTION

The term "resist component" as used in the present specification and claims includes alkali-soluble resins such as novolak resins and polyvinyl phenol resins, photoactive compounds as well as their precursors, and additives (e.g., speed enhancers, dyes, and the like) conventionally employed in photoresist compositions. This term also includes precursor compounds for making such components. Examples of such precursor compounds would be backbone compounds for making photoactive compounds as well as the precursor photoactive ester compounds (e.g., naphthoquinone diazide sulfonyl chlorides).

The term "novolak resin" as used herein refers to any novolak resin which will dissolve completely in an alkaline developing solution conventionally used with positive-working photoresist composition. Suitable novolak resins include phenol-formaldehyde novolak resins, cresol-formaldehyde novolak resins, xylenol-formaldehyde novolak resins, cresol-xylenol-formaldehyde novolak resins, preferably having a molecular weight of about 500 to about 40,000, and more preferably from about 800 to 20,000. These novolak resins are preferably prepared by the addition-condensation polymerization of a phenolic monomer or monomers (e.g., phenol, cresols, xylenols, or mixtures of such monomers) with an aldehyde source such as formaldehyde and are characterized by being light-stable, water-insoluble, alkali-soluble, and film-forming. One preferred class of novolak resins is formed by the addition-condensation polymerization between a mixture of meta- and para-cresols with formaldehyde having a molecular weight of about 1,000 to about 10,000. Illustrative preparations of novolak resins are disclosed in U.S. Pat. Nos. 4,377,631; 4,529,682; and 4,587,196, all of which issued to Medhat Toukhy and are incorporated herein by reference in their entireties.

Other preferred novolak resins are illustrated in U.S. patent application Ser. Nos. 07/405,802 and 07/713,891 which were filed by Charles Ebersole on Sep. 8, 1989 and Jun. 12, 1991, respectively. Their disclosures are also incorporated herein by reference in their entireties.

The term "photoactive compounds" as employed in the present specification and claims may include any conventional photoactive compound commonly used in photoresist compositions. Quinonediazide compounds are one preferred class of photoactive compounds. Naphthaquinone diazide compounds are preferred class of species in that generic class. As mentioned above, photoactive compound precursors may be treated according to the present invention. One photoactive compound precursor which has been treated according to this method is 2,6-bis(2,3,4-trihydroxyphenyl)methylene-4-methyl phenol (also known as 7-PyOL) which is described in Example 3 of U.S. Pat. No. 4,992,356.

Photoresist additives may be treated according to the present invention. Such additives may include speed enhancers, dyes, and the like. One preferred speed enhancer is 1-[(1'-methyl-1'-(4'-hydroxyphenyl)ethyl)]4-[1', 1'-bis-(4-hydroxyphenyl)ethyl]benzene (also known as TRISP-PA).

In the first step of the present process, the resist component is dissolved in a solvent or solvent mixture to facilitate the contacting of the resist component with the cationic exchange resin. Examples of suitable solvents include acetone, methoxyacetoxy propane, ethyl cellosolve acetate, N-butyl acetate, ethyl lactate, ethyl-3-ethoxy propionate, propylene glycol, alkyl ether acetate, or mixtures thereof and the like. Cosolvents such as xylene or n-butyl-acetate may also be used. One preferred solvent is a mixture of ethyl lactate and ethyl-3-ethoxy propionate wherein the weight ratio of ethyl lactate to ethyl-3-ethoxy propionate is from about 30:70 to about 80:20.

The solids contents of the resultant resist component solution is not critical. Preferably, the amount of solvent or solvents may be from about 50% to about 500%, or higher, by weight; more preferably from about 75% to about 400% by weight; based on the resist component weight.

While it is preferred to use a single resist component as the material being treated by the method of the present process, it is contemplated within the scope of the present invention that combinations of resist components may be treated. For example, it may be desirable to treat a complete positive-working photo-resist formulation (e.g., a combination of a novolak resin or resins, a photoactive compound such as quinonediazide sensitizer, and solvent or solvents as well as conventional optional minor ingredients such as dyes, speed enhancers, surfactants, and the like) according to the method of the present invention.

The metal impurities in the resist component solution may be in the form of monovalent metal cations such as alkali metals (e.g., $Na^+$ and $K^+$). Such metal impurities may come from the chemical precursors for the resist component (e.g., for novolak resins these may be phenolic monomers and aldehyde sources) as well as in the solvent used to make the solution. These impurities may also come from the catalysts used to make the resist components or from the equipment used for their synthesis or storage. Generally, the amount of metal impurities in a resist component such as a novolak resin prior to the present inventive process is the range from 500 ppb–5,000 ppb, or greater, by weight for metals such as sodium and iron. Sodium impurities are generally in the form of monovalent ions ($Na^+$). Iron may be, in part, in the form of divalent ($Fe^{+2}$) or trivalent ($Fe^{+3}$) and sometimes in the form of hydroxide or oxide celloids.

The resist component solutions may be made in any conventional method of mixing a resist component with a solvent. Generally, it is preferred that the resist component is added to a sufficient amount of solvent so that the resist component is dissolved in the solvent. This step may be facilitated by agitation or other conventional mixing means.

The next step in the process of the present invention is contacting the resist component solution with at least one cation exchange resin.

Cation exchange resins which may be useful for the present invention include any and all cation exchange resins which are able to remove metals from resist components and are compatible with the resist component and solvent employed. Suitable cation exchange resins include phenol sulfonic acid-formaldehyde condensates, phenol-benzaldehyde sulfonic acid condensates, styrene sulfonic acid-divinyl benzene copolymers, acrylic acid-divinyl benzene copolymers, methacrylic acid-divinyl benzene copolymers, and other types of sulfonic acid or carboxylic acid group-containing polymers. One preferred cation exchange resin is AMBERLYST 15 available from Rohm & Haas of Philadelphia, Pa. This is a styrene sulfonic acid-divinyl benzene copolymer.

The relative amount of cation exchange resin employed in this process is preferably from about 1% to about 10% by weight, based on the resist component solution. More preferably, these relative amounts are from about 2% to about 4% by weight, based on said solutions.

A critical feature of the present invention is the pretreatment or prewashing of the cation exchange resin with a quaternary ammonium salt solution. It has been found that said quaternary ammonium cations enhance the ion exchange reaction between a prewashed cation exchange resin and the resist component without having an adverse lowering of the pH of the treated resist component.

It is also believed that the anions in quaternary ammonium salt compounds, particularly hydroxides, can extract the cationic counter ion (e.g., $H^+$ or $Na^+$) so that the bulky quaternary ammonium cation thus becomes the counter ion on the cation exchange resin. This replacement of the $H^+$ or $Na^+$ cation counter ion with the bulky quaternary ammonium cation counter ion results in a higher efficiency of metal ion reduction and retards the hydrolysis of resist components or solvents containing said resist components.

Quaternary ammonium salt compounds may include tetramethylammonium hydroxide (TMAH), although it is believed other tetra-alkyl ammonium hydroxides as well as other classes of quaternary ammonium salts would be suitable for the present process.

Other monomeric quaternary ammonium cations may include tetraethylammonium, methyltriethanolammonium, dimethyldiethanolammonium, trimethylethanolammonium, benzylmethyldiethanolammonium.

The most preferred quaternary ammonium salt compounds are polymeric quaternary ammonium compounds. These may include hexamethrine, poly(vinylbenzyltrimethylammonium) chloride, polyimidazoline, and quaternized poly(vinylpyridine).

Polymeric quaternary ammonium compounds are preferred because of the stronger immobilization of a polymeric quaternary ammonium cation to an anionic group of cation exchange resin as compared to a monomeric quaternary ammonium cation.

The quaternary ammonium salt is contacted to the ion exchange resin in the form of a solution, most preferably, an aqueous solution. The amount of ammonium salt in solution is generally from about 1% to about 50% by weight of the solution.

The amount of quaternary ammonium salt compound employed should be in excess to the weight of the cation exchange resin being treated. Generally, the amounts of quaternary ammonium salt employed is from about 150 to 1,000% or higher, by weight of cation exchange resin.

The mode of prewashing may be any method conventionally used to wash cation exchange with water or organic solvents. One preferred method is to add the resins to a large weight excess of an aqueous solution containing 2–30% by weight the quaternary ammonium salt solution and stirring the resulting suspension for 20–60 minutes at room temperature, followed by decanting the quaternary ammonium salt solution. This stirring and decanting may be repeated 3–5 times. Thus, the washed resins may be further washed with the same solvent solution which will be used in contacting step (b) in order to preswell the cation exchange resin.

The contacting of the resist component solution with the cation exchange resin may be in a column system or a batch system. In the column system the cation exchange resin is packed together in an ion exchange column and the resist component solution is passed through the column. Preferably, the resist component solution is passed at a constant rate and constant temperature to maximize sorption of the metal impurities onto the cation exchange resin.

In the Batch System the prewashed cation exchange resin is mixed into the resist component solution to provide a resultant suspension. After a sufficient contacting time has passed, the cation exchange resin is removed, preferably by filtration, from the resist component solution. Preferably, it may be advantageous in some situations to disperse the cation exchange resin in a solvent before mixing with the resist component solution. Further, it may be preferable to carry out the contacting in this mode at a constant temperature to maximize sorption onto the cation exchange resins.

In any case, the amount of time for each contact should be sufficient to adsorb at least a portion (preferably, at least a major portion (at least 50%) by weight and, more preferably, at least 90% by weight) of the metal impurities present in the resist component solution.

The separation step (c) of the present invention necessarily occurs immediately after the contacting step (b) when the column system is used. With the batch system, the separation step (c) requires an additional step by the operator.

After the contacting and separation steps, the thus treated resist component system has a reduced metal content of less than about 100 parts per billion (ppb) by weight. For example, the amount by weight of sodium impurities may range from only 100 ppb to 20 ppb or even lower.

It may be preferred to have other optional material contact the resist component solution besides the prewashed cation exchange resin. One preferred optional ingredient is an anion exchange resin. Such resins may be employed if there is inefficient removal of nonmetals. Suitable anion exchange resins include quaternary ammonium group-containing phenolic resins, quaternary ammonium group-containing styrene-divinyl benzene copolymers, aromatic polyamines, polyethyleneamine, and the like. One preferred anionic exchange resin is a quaternary ammonium styrene-divinyl benzene resin called AMBERLYST A-27 and made by Rohm & Haas Company of Philadelphia, Pa. Another preferred anionic exchange resin is an aliphatic amino group-containing styrene-divinyl benzene resin called AMBERLYST A-21 which is also produced by Rohm & Haas.

If the untreated resist component solution contains a significant amount of insoluble colloidal hydroxides or oxides, the resist component solution may be passed through a micro-pore membrane having a pore size of 0.1–0.5 microns prior to the contacting with the cation exchange resin. This prefiltration operation will remove at least a portion of the insoluble colloids and these make the contacting step (b) more efficient.

The following Examples and Comparison are given to further illustrate the present invention. All parts and percentages are by weight unless explicitly stated otherwise.

EXAMPLE 1

A particulate cation exchange resin (1) was washed with an aqueous solution containing 25% by weight tetramethylammonium hydroxide (TMAH) by the following procedure: The cation exchange resin (10 grams) and aqueous TMAH solution (100 grams) were mixed together in a plastic bottle. The bottle was rolled in a bottle roller for 30 to 40 minutes at room temperature. The cation exchange resin particles were then separated from the aqueous TMAH solution by decantation. The separated resin particles were then again mixed with the same amount of fresh aqueous TMAH solution, rolled for 30 to 40 minutes and decanted twice more for a total of three washings. (1) AMBERLYST 15 produced by Rohm & Haas Company of Philadelphia, Pa. This cation exchange resin is a styrene sulfonic acid-divinyl benzene sulfonate copolymer.

A mixed meta-/para-cresol novolak resin was made by reacting formaldehyde with a cresol mixture which was 40% m-cresol/60% p-cresol by moles in the feed. The molecular weight of the novolak resin was 6,500 as measured by GPC. This novolak (63 grams) was dissolved in a mixed solvent of ethyl lactate (EL) (96 grams) and ethyl-3-ethoxypropionate (EEP) (41 grams). This novolak solution was placed in a plastic bottle. The thrice washed cation exchange resin (8.0 grams) was then added to the bottle.

The resultant suspension was rolled in a bottle roller for 24 hours. The cation exchange resin particles were then removed from the suspension by filtering the suspension through a membrane filter having 0.2 micron pore size.

The sodium impurity content and the pH of the novolak solution were measured before the addition of the cation exchange resins and after their removal by filtration. The sodium impurity content was determined by graphite furnace atomic absorption spectrometry. In addition, decomposition of the ethyl lactate during the resin treatment was measured by gas chromatography to determine how much polylactide was formed during the resin treatment. The results of these measurements are shown in Table 1 below.

EXAMPLE 2

The same particulate cation exchange resin employed in Example 1 was washed with an aqueous methanol solution containing 12.5% by weight poly(vinyl benzyltrimethylammonium) chloride (PBTM) (water/methanol ratio =50/50 by volume) by the following procedure: The cation exchange resin (10 grams) and the PBTM solution (100 grams) were added to a plastic bottle. The bottle was rolled in a bottle roller for 30 to 40 minutes at room temperature. The cation exchange resin particles were then separated from the PBTM solution by decantation. The separated resin particles were again mixed with the same amount of fresh PBTM solution, rolled for 30 to 40 minutes and decanted twice more for a total of three washings.

The same novolak resin solution of Example 1 (200 grams) and this PBTM-washed cation exchange resin particles (8.0 grams) were both added to a plastic bottle. The resultant suspension was rolled in a bottle roller for 24 hours. The cation exchange resin particles were then removed from the suspension by filtering the suspension through a membrane filter having 0.2 micron pore size.

The sodium impurity content, pH and polylactide formation of the resin solution were again measured in the same manner as described in Example 1. The results are shown in Table 1.

COMPARISON 1

The same particulate cation exchange resin employed in Examples 1 and 2 were washed with ethyl lactate by the following procedure: The cation exchange resin (10 grams) and ethyl lactate (100 grams) were added to a plastic bottle. The bottle was rolled in a bottle roller for 30 to 40 minutes at room temperature. The cation exchange resin particles were then separated from the ethyl lactate by decantation. The separated cation exchange resin particles were then mixed with the same amount of fresh ethyl lactate solution, rolled for 30 to 40 minutes and decanted twice more for a total of three washings.

The same novolak resin solution used in Examples 1 and 2 (200 grams) and the ethyl lactate washed cation resin particles (8.0 grams) were both added to a plastic bottle.

The resultant suspension was rolled in a bottle roller for 24 hours. The cation exchange resin particles were then removed from the suspension by filtering the suspension through a membrane filter having 0.2 micron pore size.

The sodium impurity content, pH and polylactide formation of the resin solution were again measured in the same manner as Examples 1 and 2. Those results are shown in Table 1.

TABLE 1

| Example or Comparison | Sodium (ppb) Before | Sodium (ppb) After | pH Before | pH After | POLY-LACTIDE[2] WT % |
|---|---|---|---|---|---|
| E-1 | 670 | 45 | 3.6 | 3.4 | 8.0 |
| E-2 | 670 | 60 | 3.6 | 3.0 | 5.0 |
| C-1 | 670 | 39 | 3.6 | 2.4 | 17.0 |

[2]The polylactide wt. % is the weight of polylactide measured based on the amount of ethyl lactate tested.

The gas chromatography test for polylactide involved the following steps:
 (a) The cation exchange resin is added to ethyl lactate by 4 wt. percent and the resulting suspension is rolled for 24 hours at room temperature.
 (b) The resin is removed from the solvent by filtration.
 (c) The solvent is heated at 70°–80° C. under reduced pressure to be evaporated.
 (d) Resulting viscous residues are weighed to determine a weight percent of the residues to the solvent charged. The measured weight percent is given in Table 1.

The residues were identified to be polylactide by infrared spectroscopy using an authentic sample of polylactide.

The results given in Table 1 indicate the following benefits for the prewashing with a quaternary ammonium salt solution, particularly for a polymeric salt:

1. The pH change of novolak solution before and after the treatment with the quaternary ammonium salt prewashed resin was significantly smaller than that of the reference (C-1). The lower of pH results in deterioration of lithographic performance of photoresist.

2. The degree of decomposition of ethyl lactate (polylactide formation) with the quaternary ammonium salt prewashed resin was significantly lower than that of the reference (C-1). The polylactide formation leads to deterioration of lithographic performance of photoresist.

3. Efficiency of the metal reduction with the quaternary ammonium salt prewashed resin was almost the same as that of the reference (C-1).

4. In addition to the above, the polymeric salt prewashing system showed an additional benefit of a lower degree of release of the quaternary ammonium cation to the novolak solution compared with the corresponding monomeric system; the contamination with quaternary ammonium cation results in deterioration of lithographic performance of photoresist.

While the invention has been described above with reference to specific embodiments thereof, it is apparent that many changes, modifications, and variations can be made without departing from the inventive concept disclosed herein. Accordingly, it is intended to embrace all such changes, modifications, and variations that fall within the spirit and broad scope of the appended claims. All patent applications, patents, and other publications cited herein are incorporated by reference in their entirety.

What is claimed is:

1. A method of removing metal impurities from a resist component comprising the steps of:
    (a) dissolving said resist component in a solvent;
    (b) washing a cation exchange resin with a quaternary ammonium compound salt solution;
    (c) contacting the prewashed cation exchange resin with the solution of resist component to remove metal impurities from said solution of resist component; and
    (d) separating said cation exchange resin bearing said metal impurities from said resist component solution.

2. The method of claim 1 wherein said quaternary ammonium salt compound is a polymeric ammonium salt compound.

3. The method of claim 2 wherein said polymeric ammonium salt compound is poly(vinylbenzyltrimethylammonium) chloride.

4. The method of claim 1 wherein the mode of contacting comprises adding said cation exchange resin and to said resist component solution.

5. The method of claim 1 wherein said contacting and separating steps comprise passing said resist component solution through at least one ion exchange column or bed containing said cation exchange resin.

6. A method of removing metal impurities from a novolak resin, comprising the steps of:
    (a) dissolving said novolak resin in a solvent;
    (b) contacting said novolak resin solution with at least one cation exchange resin for sufficient amount of time to transfer at least a major portion of said metal impurities onto said cation exchange resin, wherein said cation exchange resin is prewashed with a solution of a quaternary ammonium salt compound; and
    (c) separating said cation exchange resin bearing said metal impurities from said novolak resin solution.

7. The method of claim 6 wherein said contacting is carried out by adding said cation exchange resin to said novolak resin solution.

8. The method of claim 6 wherein said contacting and separating steps are carried out by passing said novolak resin solution through at least one ion exchange column or bed comprising said cation exchange resin.

9. The method of claim 6 wherein said quaternary ammonium salt compound is polymeric ammonium salt compound.

10. The method of claim 9 wherein said polymeric ammonium salt compound is poly(vinylbenzyltrimethylammonium) chloride.

* * * * *